US012586210B2

(12) United States Patent
Jin et al.

(10) Patent No.: US 12,586,210 B2
(45) Date of Patent: Mar. 24, 2026

(54) BIDIRECTIONAL OPTICAL FLOW ESTIMATION METHOD AND APPARATUS

(71) Applicant: Samsung Electronics Co., Ltd., Suwon-si (KR)

(72) Inventors: Xin Jin, Nanjing (CN); Guotao Shen, Nanjing (CN); Youxin Chen, Nanjing (CN); Longhai Wu, Nanjing (CN); Jie Chen, Nanjing (CN); Jayoon Koo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 18/168,209

(22) Filed: Feb. 13, 2023

(65) Prior Publication Data

US 2023/0281829 A1 Sep. 7, 2023

(30) Foreign Application Priority Data

Mar. 4, 2022 (CN) .......................... 202210207725.2

(51) Int. Cl.
| | |
|---|---|
| *G06T 7/20* | (2017.01) |
| *G06T 3/18* | (2024.01) |
| *G06T 3/40* | (2024.01) |

(52) U.S. Cl.
CPC .................. *G06T 7/20* (2013.01); *G06T 3/18* (2024.01); *G06T 3/40* (2013.01); *G06T 2207/20016* (2013.01); *G06T 2207/20084* (2013.01)

(58) Field of Classification Search
CPC .... G06T 7/20; G06T 3/18; G06T 3/40; G06T 2207/20016; G06T 2207/20084
See application file for complete search history.

(56) References Cited

U.S. PATENT DOCUMENTS

| | | | |
|---|---|---|---|
| 8,712,095 B2 | 4/2014 | Gaddy | |
| 10,657,424 B2* | 5/2020 | Wang | ................... G06V 10/764 |

(Continued)

FOREIGN PATENT DOCUMENTS

| | | |
|---|---|---|
| CN | 112785629 A | 5/2021 |
| CN | 113538525 A | 10/2021 |

(Continued)

OTHER PUBLICATIONS

Hui, T. W., Tang, X., & Loy, C. C. (2018): LiteFlowNet—A lightweight convolutional neural network for optical flow estimation. In Proceedings of the IEEE conference on computer vision and pattern recognition (pp. 8981-8989) (Year: 2018).*

(Continued)

*Primary Examiner* — Utpal D Shah
*Assistant Examiner* — Jack Peter Kraynak
(74) *Attorney, Agent, or Firm* — Jefferson IP Law, LLP

(57) ABSTRACT

A bidirectional optical flow estimation method and apparatus are provided. The method includes acquiring a target image pair of which optical flow is to be estimated, and constructing an image pyramid for each target image in the target image pair respectively, and performing bidirectional optical flow estimation using a pre-trained optical flow estimation model based on the image pyramid, to obtain bidirectional optical flow between the target images. An optical flow estimation module in the optical flow estimation model is recursively called to perform the bidirectional optical flow estimation sequentially based on images of respective layers in the image pyramid according to a preset order, forward warping towards middle processing is performed on an image of a corresponding layer of the image pyramid before each call of the optical flow estimation module, and an image of an intermediate frame obtained by the forward warping towards middle processing is inputted (Continued)

into the optical flow estimation module. With the disclosure, the efficiency and generalization of bidirectional optical flow estimation can be improved, and model training and optical flow estimation overheads can be reduced.

7 Claims, 9 Drawing Sheets

(56) References Cited

U.S. PATENT DOCUMENTS

| | | | | |
|---|---|---|---|---|
| 10,943,141 | B2 * | 3/2021 | Sawada | G06V 20/58 |
| 11,030,721 | B2 * | 6/2021 | Anilkumar | G06T 7/174 |
| 11,734,837 | B2 | 8/2023 | Sun et al. | |
| 2006/0188013 | A1 | 8/2006 | Coimbra et al. | |
| 2010/0124361 | A1 | 5/2010 | Gaddy | |
| 2015/0365696 | A1 | 12/2015 | Garud et al. | |
| 2020/0084427 | A1 * | 3/2020 | Sun | G06N 3/045 |
| 2021/0044811 | A1 | 2/2021 | Hodgkinson et al. | |
| 2021/0383169 | A1 | 12/2021 | Wang et al. | |
| 2022/0092795 | A1 * | 3/2022 | Liu | H04N 7/0127 |

FOREIGN PATENT DOCUMENTS

| | | |
|---|---|---|
| CN | 113538527 A | 10/2021 |
| CN | 113673545 A | 11/2021 |
| CN | 113781517 A | 12/2021 |
| CN | 113838102 A | 12/2021 |
| JP | 6230751 B1 | 11/2017 |
| WO | 2020/050828 A1 | 3/2020 |
| WO | 2020/150264 A1 | 7/2020 |

OTHER PUBLICATIONS

Hur, J., Roth, S.: Iterative residual refinement for joint optical flow and occlusion estimation. In: Proceedings of the IEEE Conference on Computer Vision and Pattern Recognition, pp. 5754-5763 (2019) (Year: 2019).*

J. Zhuang, Z. Qin, J. Chen and T. Wan, "A Lightweight Network Model For Video Frame Interpolation Using Spatial Pyramids," 2020 IEEE International Conference on Image Processing (ICIP), Abu Dhabi, United Arab Emirates, 2020, pp. 543-547, doi: 10.1109/ICIP40778.2020.9191039. (Year: 2020).*

D. Gu, Z. Wen, W. Cui, R. Wang, F. Jiang and S. Liu, "Continuous Bidirectional Optical Flow for Video Frame Sequence Interpolation," 2019 IEEE International Conference on Multimedia and Expo (ICME), Shanghai, China, 2019, pp. 1768-1773, doi: 10.1109/ICME.2019.00304 (Year: 2019).*

Saxena, R., Schuster, R., Wasenmüller, O., & Stricker, D. (2019). PWOC-3D: Deep Occlusion-Aware End-to-End Scene Flow Estimation. 2019 IEEE Intelligent Vehicles Symposium (IV), 324-331. (Year: 2019).*

Sun, D., Yang, X., Liu, M. Y., & Kautz, J. (2018). Pwc-net: Cnns for optical flow using pyramid, warping, and cost vol. In Proceedings of the IEEE conference on computer vision and pattern recognition (pp. 8934-8943). (Year: 2018).*

Ranjan, A., & Black, M. J. (2017). Optical flow estimation using a spatial pyramid network. In Proceedings of the IEEE conference on computer vision and pattern recognition (pp. 4161-4170) (Year: 2017).*

Anurag Ranjan and Michael J. Black, "Optical flow estimation using a spatial pyramid network." 2017.

Deqing Sun et al., "Pwc-net: Cnns for optical flow using pyramid, warping, and cost volume." 2018.

Zachary Teed and Jia Deng, "Raft: Recurrent all-pairs field transforms for optical flow." 2020.

Wang et al, Two-stream face spoofing detection network combined with hybrid pooling, Jul. 16, 2020, https://qikan.cqvip.com/Qikan/Article/Detail?id=7102408484&from=Qikan_Search_Index.

Study on Driving Behavior Detection Method Based on Improved Long and Short-term Memory Network, Dec. 31, 2021.

Jiang et al, Super SloMo: High Quality Estimation of Multiple Intermediate Frames for Video Interpolation, Jul. 13, 2018.

Chinese Office Action dated May 9, 2024, issued in Chinese Patent Application No. 202210207725.2.

* cited by examiner

FIG. 2

START

ACQUIRE A TARGET IMAGE PAIR OF WHICH OPTICAL FLOW ARE TO BE ESTIMATED, AND CONSTRUCT AN IMAGE PYRAMID FOR EACH TARGET IMAGE IN THE TARGET IMAGE PAIR RESPECTIVELY ⎯ 201

PERFORM BIDIRECTIONAL OPTICAL FLOW ESTIMATION USING A PRE-TRAINED OPTICAL FLOW ESTIMATION MODEL BASED ON THE IMAGE PYRAMID, TO OBTAIN BIDIRECTIONAL OPTICAL FLOW BETWEEN THE TARGET IMAGES, IN WHICH AN OPTICAL FLOW ESTIMATION MODULE IN THE OPTICAL FLOW ESTIMATION MODEL IS RECURSIVELY CALLED TO PERFORM THE BIDIRECTIONAL OPTICAL FLOW ESTIMATION SEQUENTIALLY BASED ON IMAGES OF RESPECTIVE LAYERS IN THE IMAGE PYRAMID ACCORDING TO A PRESET ORDER, FORWARD WARPING TOWARDS MIDDLE PROCESSING IS PERFORMED ON AN IMAGE OF A CORRESPONDING LAYER OF THE IMAGE PYRAMID BEFORE EACH CALL OF THE OPTICAL FLOW ESTIMATION MODULE, AND AN IMAGE OF AN INTERMEDIATE FRAME OBTAINED BY THE FORWARD WARPING TOWARDS MIDDLE PROCESSING IS INPUTTED INTO THE OPTICAL FLOW ESTIMATION MODULE ⎯ 202

END

FIG. 5
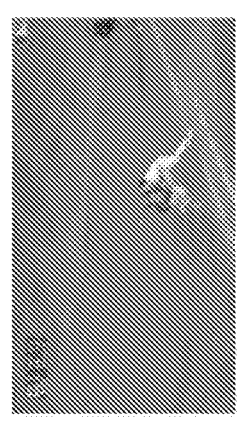
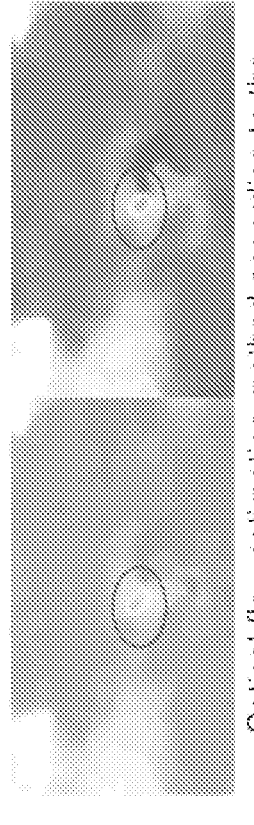
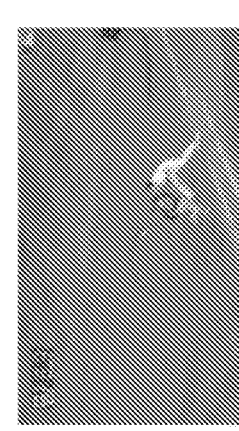
frame-1
Optical flow estimation method according to the embodiments of the present invention
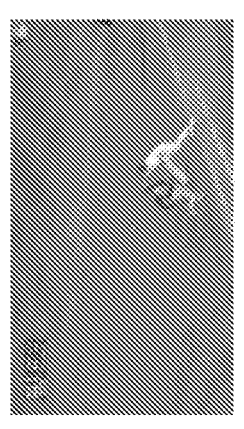
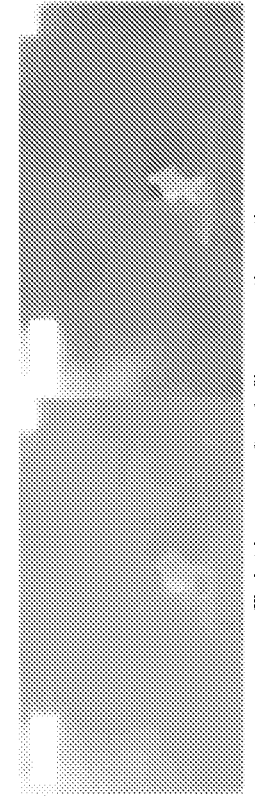
frame-0
Existing optical flow estimation method

BIDIRECTIONAL OPTICAL FLOW ESTIMATION METHOD AND APPARATUS

CROSS-REFERENCE TO RELATED APPLICATION(S)

This application is based on and claims priority under 35 U.S.C. § 119(a) of a Chinese patent application number 202210207725.2, filed on Mar. 4, 2022, in the Chinese Intellectual Property Office, the disclosure of which is incorporated by reference herein in its entirety.

BACKGROUND

1. Field

The disclosure relates to computer vision technology. More particularly, the disclosure relates to a bidirectional optical flow estimation method and apparatus.

2. Description of Related Art

In computer vision, optical flow is often used to characterize pixel-level motions in images, which may be caused by camera movement or by the motion of an object. The optical flow (also called an optical flow field) refers to a set of pixel displacements between two adjacent frames of pictures, i.e. a set of displacement vectors generated in a process of moving each pixel in the previous picture to a corresponding pixel position in the subsequent picture. Optical flow estimation is a classical problem in computer vision, or a key step of many video understanding algorithms. Video frame interpolation, moving object detection, video content understanding, and other algorithms often rely on accurate optical flow information.

The optical flow may be divided into sparse optical flow and dense optical flow according to whether to select image sparse points for optical flow estimation. The dense optical flow describes optical flow of each pixel of an image moving to a next frame. The optical flow in a general context refers to the dense optical flow, and the disclosure also proposes a technical solution for the dense optical flow.

An optical flow estimation method based on feature pyramids is a commonly used optical flow estimation algorithm. FIG. 1 is a schematic diagram of optical flow estimation of the method according to the related art.

Referring to FIG. 1, according to the method, feature pyramids (i.e. feature pyramid 1 and feature pyramid 2 in the figure) are constructed based on two adjacent frames of original input pictures respectively. As the number of pyramid layers is increased, a feature size is gradually reduced. Then, feature data of the 0th layer of the feature pyramid is inputted into an optical flow estimation model for processing to obtain an optical flow estimation value. The optical flow estimation model is a convolutional neural network (CNN) composed of a warping layer, a cost volume layer and an optical flow estimation layer.

During the implementation of the disclosure, the inventors have found that the above-mentioned existing optical flow estimation method has problems such as large operational overheads, low efficiency and poor generalization.

The above information is presented as background information only to assist with an understanding of the disclosure. No determination has been made, and no assertion is made, as to whether any of the above might be applicable as prior art with regard to the disclosure.

SUMMARY

By research and analysis, it is found that the reasons for the above-mentioned problems are as follows.

In the above-mentioned optical flow estimation method, the optical flow estimation model has a large scale of parameters, so that the optical flow estimation model has large training overheads and low operational efficiency.

The robustness of the optical flow estimation model in the above-mentioned optical flow estimation method is limited by the picture scale of a target data set during model training. When a scale required for optical flow by a downstream task interfacing with the optical flow estimation method is greater than the picture scale of the training data set, the corresponding optical flow estimation cannot be performed based on the optical flow estimation model. Therefore, the robustness of the above-mentioned optical flow estimation method for different scales of optical flow is limited by the picture scale of the target data set during training, and it is often unable to achieve good generalization results in practical applications.

The above-mentioned optical flow estimation method can only obtain unidirectional optical flow between adjacent frames when running once, and needs to run twice for bidirectional optical flow. Therefore, estimation for the bidirectional optical flow is low in efficiency and cannot meet the requirements of real-time performance.

Aspects of the disclosure are to address at least the above-mentioned problems and/or disadvantages and to provide at least the advantages described below. Accordingly, an aspect of the disclosure is to provide a bidirectional optical flow estimation method and apparatus, which can improve the efficiency and generalization of bidirectional optical flow estimation and reduce model training and optical flow estimation overheads.

Additional aspects will be set forth in part in the description which follows and, in part, will be apparent from the description, or may be learned by practice of the presented embodiments.

In accordance with an aspect of the disclosure, a bidirectional optical flow estimation method is provided. The method includes acquiring a target image pair of which optical flow is to be estimated, and constructing an image pyramid for each target image in the target image pair, performing bidirectional optical flow estimation using a pre-trained optical flow estimation model based on the image pyramid for each target image to obtain bidirectional optical flow between the target images of the target image pair, wherein an optical flow estimation module in the optical flow estimation model is recursively called to perform the bidirectional optical flow estimation sequentially based on images of respective layers in the image pyramid for each target image according to a preset order, wherein forward warping towards middle processing is performed on an image of a corresponding layer of the image pyramid before each call of the optical flow estimation module, and wherein an image of an intermediate frame obtained by the forward warping towards middle processing is inputted into the optical flow estimation module.

In accordance with another aspect of the disclosure, a bidirectional optical flow estimation apparatus is provided. The apparatus includes an image pyramid construction unit, configured to acquire a target image pair of which optical flow is to be estimated, and construct an image pyramid for each target image in the target image pair, and an optical flow estimation unit, configured to perform bidirectional optical flow estimation using a pre-trained optical flow estimation model based on the image pyramid for each target image to obtain bidirectional optical flow between the target images of the target image pair, wherein an optical flow estimation module in the optical flow estimation model is recursively called to perform the bidirectional optical flow estimation sequentially based on images of respective layers in the image pyramid according to a preset order, wherein forward warping towards middle processing is performed on an image of a corresponding layer of the image pyramid before each call of the optical flow estimation module, and wherein an image of an intermediate frame obtained by the forward warping towards middle processing is inputted into the optical flow estimation module.

Embodiments of the disclosure also provide a bidirectional optical flow estimation device, including a processor and a memory.

The memory stores an application program executable by the processor for causing the processor to perform the bidirectional optical flow estimation method as described above.

Embodiments of the disclosure also provide a computer-readable storage medium, storing computer-readable instructions for performing the bidirectional optical flow estimation method as described above.

Embodiments of the disclosure also provide a computer program product, including computer programs/instructions which, when executed by a processor, implement the steps of the bidirectional optical flow estimation method as described above.

In summary, according to the bidirectional optical flow estimation scheme proposed in the disclosure, bidirectional optical flow estimation is performed in a recursive calling manner based on the image pyramids for a target image pair of which optical flow is to be estimated. Thus, on the one hand, the speed of optical flow estimation can be increased by using the image pyramids, and on the other hand, the number of parameters of the model can be reduced by recursive calling, and model training and optical flow estimation overheads can be further reduced. Moreover, by combining the recursive calls and the image pyramids, the robustness for different scales of optical flow can be improved and the generalization can be enhanced. In addition, before each optical flow estimation, forward warping towards middle processing is performed on images of corresponding layers of the image pyramid, and optical flow estimation is performed based on an image of an intermediate frame obtained by the processing. Thus, the accuracy of optical flow estimation can be improved. Therefore, with the embodiments of the disclosure, the efficiency, accuracy and generalization of bidirectional optical flow estimation can be improved, and model training and optical flow estimation overheads can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a schematic flowchart of a method according to an embodiment of the disclosure;

FIGS. 5, 6, 7, and 8 show schematic diagrams of embodiments applied to different application scenarios according to various embodiments of the disclosure.

Throughout the drawings, it should be noted that like reference numbers are used to depict the same or similar elements, features, and structures.

DETAILED DESCRIPTION

Figure 1:
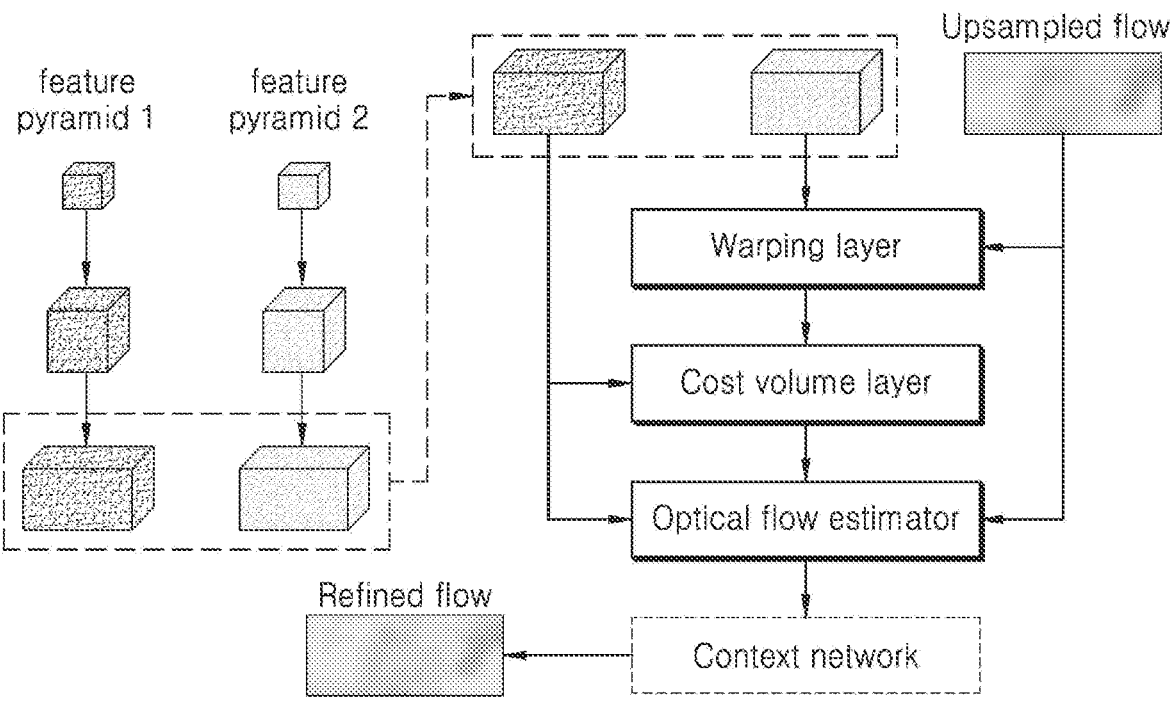
FIG. 1 is a schematic diagram of an existing optical flow estimation method based on feature pyramids according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 2 is a schematic flowchart of a bidirectional optical flow estimation method according to an embodiment of the disclosure. Referring to FIG. 2, the bidirectional optical flow estimation method implemented in this embodiment includes the following operations 201-202.

In operation 201, a target image pair of which optical flow is to be estimated is acquired, and an image pyramid is constructed for each target image in the target image pair respectively.

In this operation, in order to facilitate improving the efficiency of subsequent optical flow estimation, a corresponding image pyramid instead of a feature pyramid is constructed respectively based on each image in a target image pair (specifically composed of images of two successive frames) of which optical flow is to be estimated currently. In this way, in a subsequent operation, forward warping towards middle processing (i.e. a forward warping operation) may be quickly performed based on the images, so that recursive optical flow estimation may be performed using a result of middle forward warping processing, and the efficiency and accuracy of bidirectional optical flow estimation can be further improved.

The construction of the image pyramid in the operation may be achieved using existing methods. The specific number of layers of the image pyramid is related to the scale of a target image, and the larger the scale of a target image has, the more the number of layers of the pyramid has.

In practical applications, a three-layer image pyramid may be constructed, i.e. processing an original target image into three pictures with different scales. The width and height of the uppermost image are both ¼ of those of the original image, the width and height of the middle image are ½ of those of the original image, and the lowermost image is the original image.

In operation 202, bidirectional optical flow estimation is performed using a pre-trained optical flow estimation model based on the image pyramid, to obtain bidirectional optical flow between the target images. An optical flow estimation module in the optical flow estimation model is recursively called to perform the bidirectional optical flow estimation sequentially based on images of respective layers in the image pyramid according to a preset order, forward warping towards middle processing is performed on an image of a corresponding layer of the image pyramid before each call of the optical flow estimation module, and an image of an intermediate frame obtained by the forward warping towards middle processing is inputted into the optical flow estimation module.

The operation is used for performing the bidirectional optical flow estimation using a pre-trained optical flow estimation model based on the image pyramids for two target images obtained in operation 201.

Here, when the bidirectional optical flow estimation is performed, the optical flow estimation module in the optical flow estimation model needs to be recursively called to perform the bidirectional optical flow estimation. That is, each time the optical flow estimation module is called to perform the bidirectional optical flow estimation, an optical flow estimation result outputted from a previous call of the optical flow estimation module is needed to perform the optical flow estimation. In this way, all optical flow estimations may share parameters by adopting a model structure of recursively calling the optical flow estimation module. Thus, on the one hand, the number of parameters of the model can be greatly reduced, and on the other hand, multi-scale optical flow training can be facilitated. By combining the image pyramids with the recursive optical flow estimation, the model can be trained or refined on low-resolution data, but can achieve good generalization results on high-resolution pictures, and has strong robustness for different scales of optical flow, thus effectively improving the robustness of the model for different scales of optical flow.

In addition, in the operation, before each call of the optical flow estimation module, Forward warping towards middle processing on an image of a corresponding layer of the image pyramid (i.e. an image in the image pyramid, which needs to be inputted into the optical flow estimation module for optical flow estimation currently) is performed. Then, the optical flow estimation module is called to perform optical flow estimation based on an image of an intermediate frame obtained by the forward warping towards middle processing, i.e. to perform warping processing on pictures of two successive frames towards an intermediate frame based on bidirectional optical flow, so that the same object in the successive frames is moved to a near position. In this way, on the one hand, it is advantageous to encode currently estimated optical flow on the feature level, and on the other hand, it is convenient to construct an accurate cost volume in the optical flow estimation module, and the cost volume is a very discriminative feature for optical flow estimation, so that the accuracy of optical flow estimation can be effectively improved.

Figure 3:
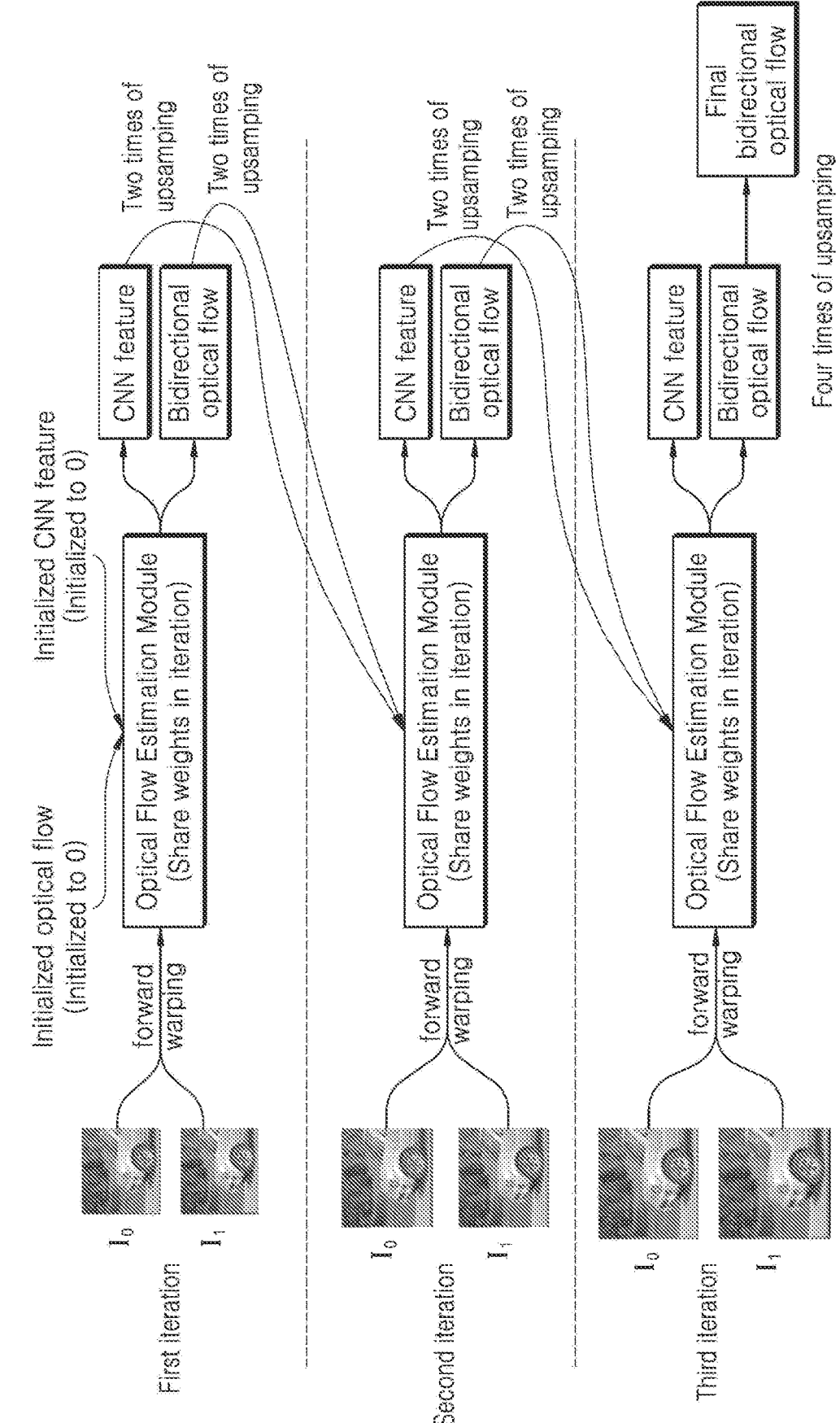
FIG. 3 is a schematic diagram of a process of optical flow estimation based on an example of an optical flow estimation model according to an embodiment of the disclosure.

FIG. 3 shows a schematic diagram of a process of optical flow estimation based on an example of an optical flow estimation model according to an embodiment of the disclosure. Referring to FIG. 3, final bidirectional optical flow is obtained by three recursive calls of the optical flow estimation module in the optical flow estimation model based on each layer of image for two three-layer image pyramids of a target image pair sequentially. That is, starting from images with the lowest resolution, the image pyramids are iterated for three times, and the final bidirectional optical flow is outputted on pictures with the highest resolution. Before each call of the optical flow estimation module to perform optical flow estimation, a forward warping operation on images of two successive frames on a corresponding pyramid layer is performed, so that an image of an intermediate frame obtained by the forward warping operation may be used to perform optical flow estimation accurately and quickly.

Preferably, in order to save operational overheads and better process optical flow with a large scale, in one implementation, the order of performing optical flow estimation based on the image pyramid may be: an ascending order of image scales, i.e. the optical flow estimation module is recursively called to perform bidirectional optical flow estimation by traversing respective layers of images in the pyramid sequentially from the top of the pyramid to the bottom of the pyramid.

In one implementation, forward warping towards middle processing may be performed specifically by the following methods.

If the optical flow estimation module is to be called for the first time currently, the forward warping towards middle processing is performed based on uppermost images in the image pyramids and initial bidirectional optical flow, to obtain images of intermediate frames corresponding to the uppermost images respectively; or otherwise, the forward warping towards middle processing is performed based on corresponding images in the image pyramids of a current call of the optical flow estimation module and bidirectional optical flow outputted from a previous call of the optical flow estimation module, to obtain images of intermediate frames of the corresponding images respectively. The initial bidirectional optical flow is 0.

In the above-mentioned method for forward warping towards middle processing, the bidirectional optical flow obtained from the previous optical flow estimation is needed to perform the forward warping towards middle processing, and thus the optical flow which has been currently estimated is encoded on a feature level, so as to facilitate improving the robustness of the model for different scales of optical flow.

Figure 4:
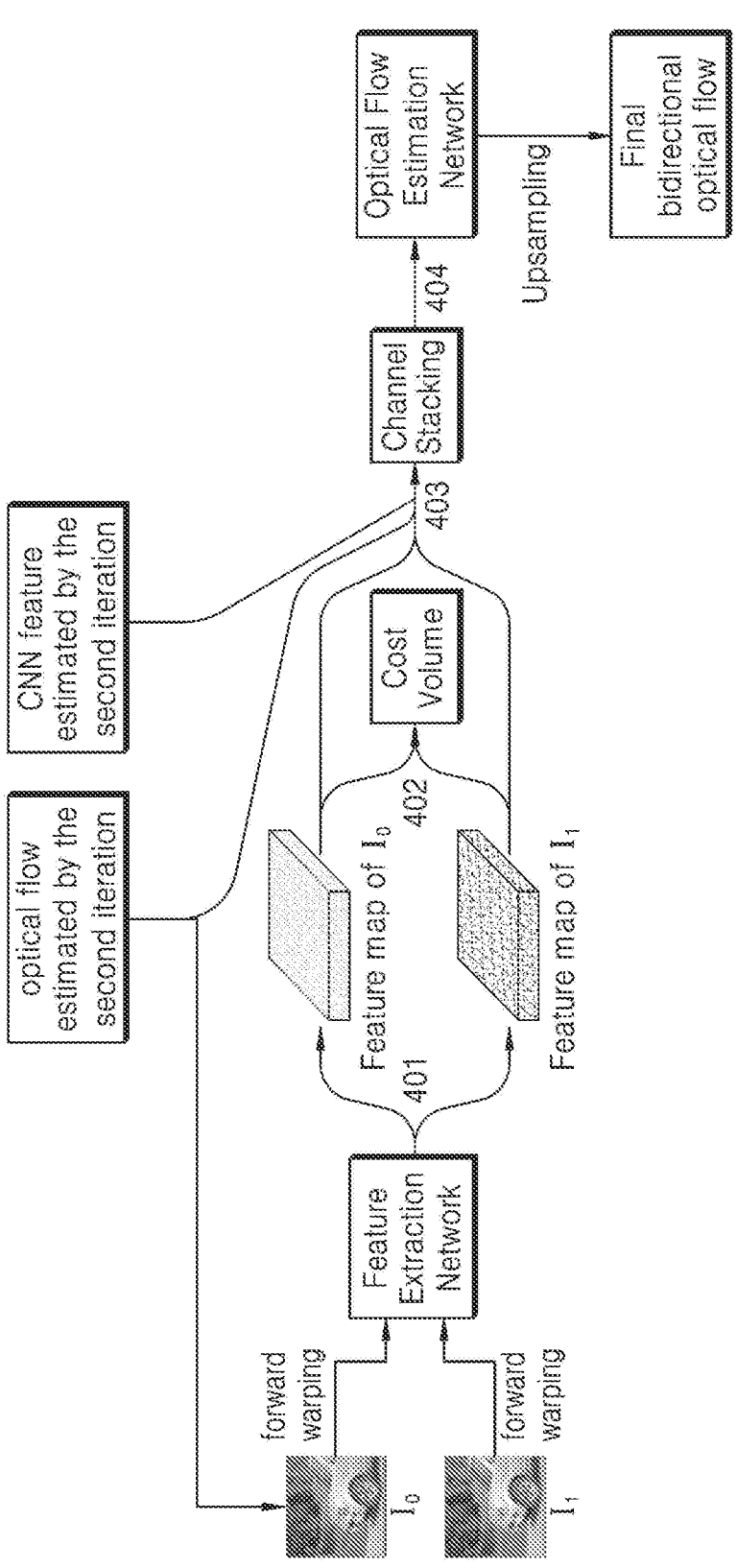
FIG. 4 is a schematic diagram of optical flow estimation of an optical flow estimation module according to an embodiment of the disclosure.

FIG. 4 is a schematic diagram of a process of bidirectional optical flow estimation using an optical flow estimation model according to an embodiment of the disclosure. Referring to FIG. 4, in one implementation, bidirectional optical flow estimation may be performed specifically by the following steps.

In step 401, feature extraction is performed on the image of the intermediate frame inputted to the optical flow estimation module using a CNN feature extractor, to obtain a CNN feature of the image of the intermediate frame.

The specific method for feature extraction in the step is known to a person skilled in the art, and detailed descriptions thereof are omitted herein.

In step 402, a corresponding cost volume is determined based on the CNN feature of the image of the intermediate frame.

The step is used to construct a corresponding cost volume based on the CNN feature of the image of the intermediate frame, so as to use the cost volume to improve the accuracy of optical flow estimation. The specific method for constructing the cost volume may be implemented using the prior art, and detailed descriptions thereof are omitted herein.

In step 403, channel stacking is performed using the CNN feature of the image of the intermediate frame, the cost volume, bidirectional optical flow outputted from a previous optical flow estimation, and a CNN feature of the bidirectional optical flow outputted from the previous optical flow estimation.

Here, the CNN feature of the bidirectional optical flow outputted from the previous optical flow estimation is a CNN feature of the last layer of the optical flow estimation network in the optical flow estimation module during the previous optical flow estimation.

In the step, the CNN feature of the image of the intermediate frame obtained in step 401, the cost volume obtained in step 402, the bidirectional optical flow outputted from the previous optical flow estimation, and the CNN feature of the bidirectional optical flow outputted from the previous optical flow estimation are integrated to achieve recursive bidirectional optical flow estimation.

In one implementation, channel stacking is performed specifically by the following methods.

If the optical flow estimation module is called for the first time currently, the channel stacking is performed on the CNN feature of the image of the intermediate frame, the cost volume, an initial bidirectional optical flow, and a CNN feature of the initial bidirectional optical flow; or otherwise, channel stacking is performed on the CNN feature of the image of the intermediate frame, the cost volume, the bidirectional optical flow outputted from the previous optical flow estimation by the optical flow estimation module, and the CNN feature of the bidirectional optical flow. The initial bidirectional optical flow is 0, and the CNN feature of the initial bidirectional optical flow is 0.

In step 404, a channel stacking result is inputted into an optical flow estimation network to perform optical flow estimation, and up-sampling is performed on bidirectional optical flow obtained by the optical flow estimation and a CNN feature of the bidirectional optical flow respectively, and an up-sampling result is outputted.

Here, considering that the optical flow estimation network needs to down-sample input features when performing optical flow estimation, an outputted result needs to be up-sampled after optical flow estimation, so as to integrate it with pyramid images participating in the next optical flow estimation and corresponding features, or obtain bidirectional optical flow finally matched with target images in scale.

Specifically, in one implementation, if the optical flow estimation module is called for the Nth time currently and N is the number of layers of the image pyramid, a resolution of the up-sampling result is matched with a resolution of the lowermost image of the image pyramid; or otherwise, a resolution of the up-sampling result is matched with a resolution of an image inputted in the next optical flow estimation.

Referring to FIG. 4, based on the three-layer image pyramid described above, when the optical flow estimation network performs two times of double down-sampling, the optical flow estimated at each layer is ¼ of the input image of this layer. Accordingly, double up-sampling is required for the outputted results of the first two optical flow estimations, and quadruple up-sampling is required for the outputted result of the third optical flow estimation.

The optical flow estimation network used for optical flow estimation in the optical flow estimation module is a CNN network, which may be specifically constructed using existing methods. Detailed descriptions thereof are omitted herein.

It can be seen from the above-mentioned technical solution that in the above-mentioned method embodiment, bidirectional optical flow estimation is performed in a recursive calling manner based on the image pyramids for a target image pair of which optical flow is to be estimated. Moreover, before each optical flow estimation, forward warping towards middle processing is performed firstly on corresponding layers of images in the image pyramids, and then bidirectional optical flow estimation is performed based on an image of the intermediate frame obtained by the processing. Thus, by combining the recursive calls of the optical flow estimation module and the image pyramids, the scheme is performed only once, and bidirectional optical flow of the target image pair may be obtained, so that the efficiency, accuracy and generalization of bidirectional optical flow estimation can be effectively improved, and model training and optical flow estimation overheads can be reduced. Therefore, the optical flow estimation scheme proposed in the disclosure can have a strong application potential under the limitation of high requirement of real-time performance or low computational power consumption for various optical flow-based application scenarios.

Specific applications of the above-mentioned method embodiments are exemplified below in connection with various application scenarios.

FIG. 5 is a schematic diagram of optical flow-based video frame interpolation according to an embodiment of the disclosure. Referring to FIG. 5, a frame-0 image and a frame-1 image are inputted, bidirectional optical flow between the two frames of images is firstly calculated, and then pixel synthesis is performed based on the optical flow to obtain an intermediate frame. Referring to FIG. 5, it can be seen that the optical flow of small objects may be accurately characterized using the method embodiment of the disclosure, resulting in better synthesis results.

Figure 6:
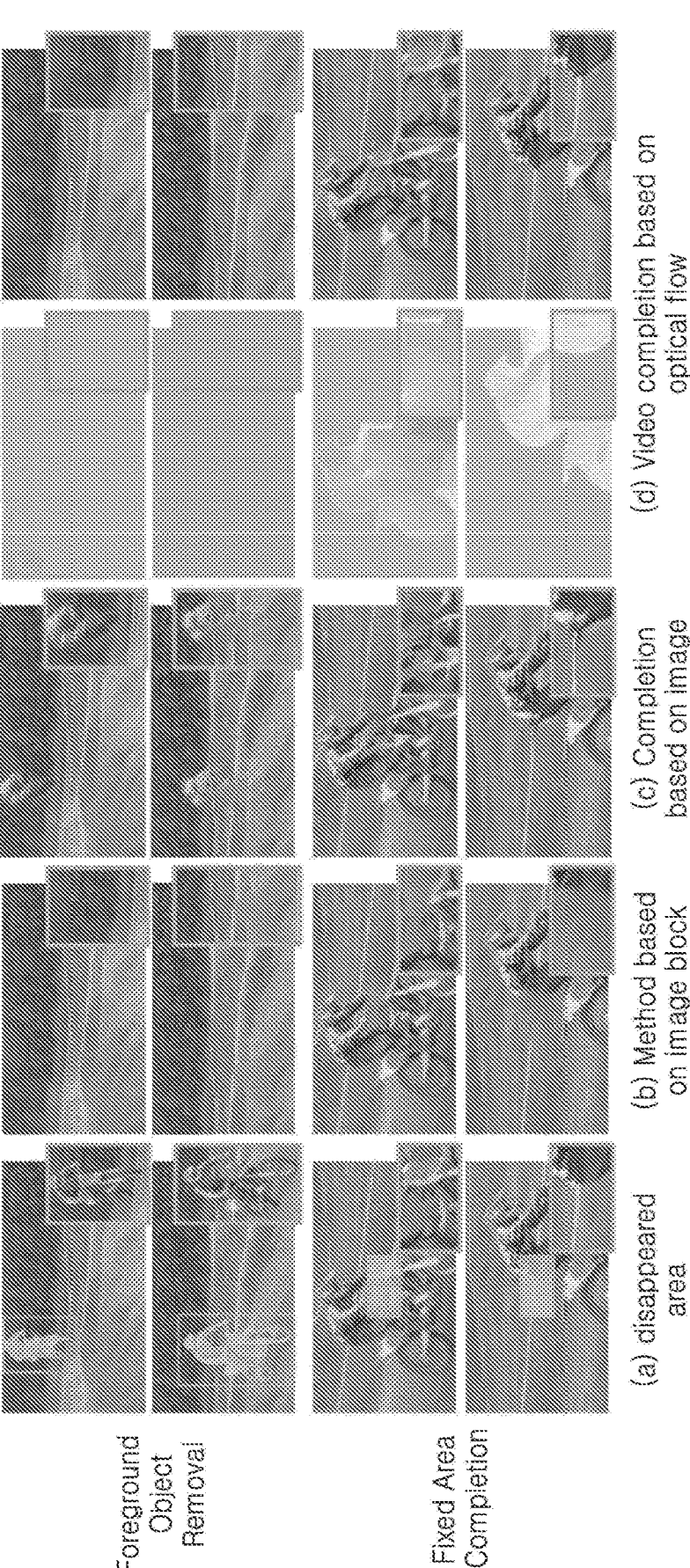

FIG. 6 is a schematic diagram of optical flow-based video image completion according to an embodiment of the disclosure. Referring to FIG. 6, image completion refers to the completion of lost or low-quality regions in images. Since the optical flow estimation method adopted in the embodiments of the disclosure can achieve a good balance between efficiency and accuracy, real-time video image completion tasks can be served well.

Figure 7:
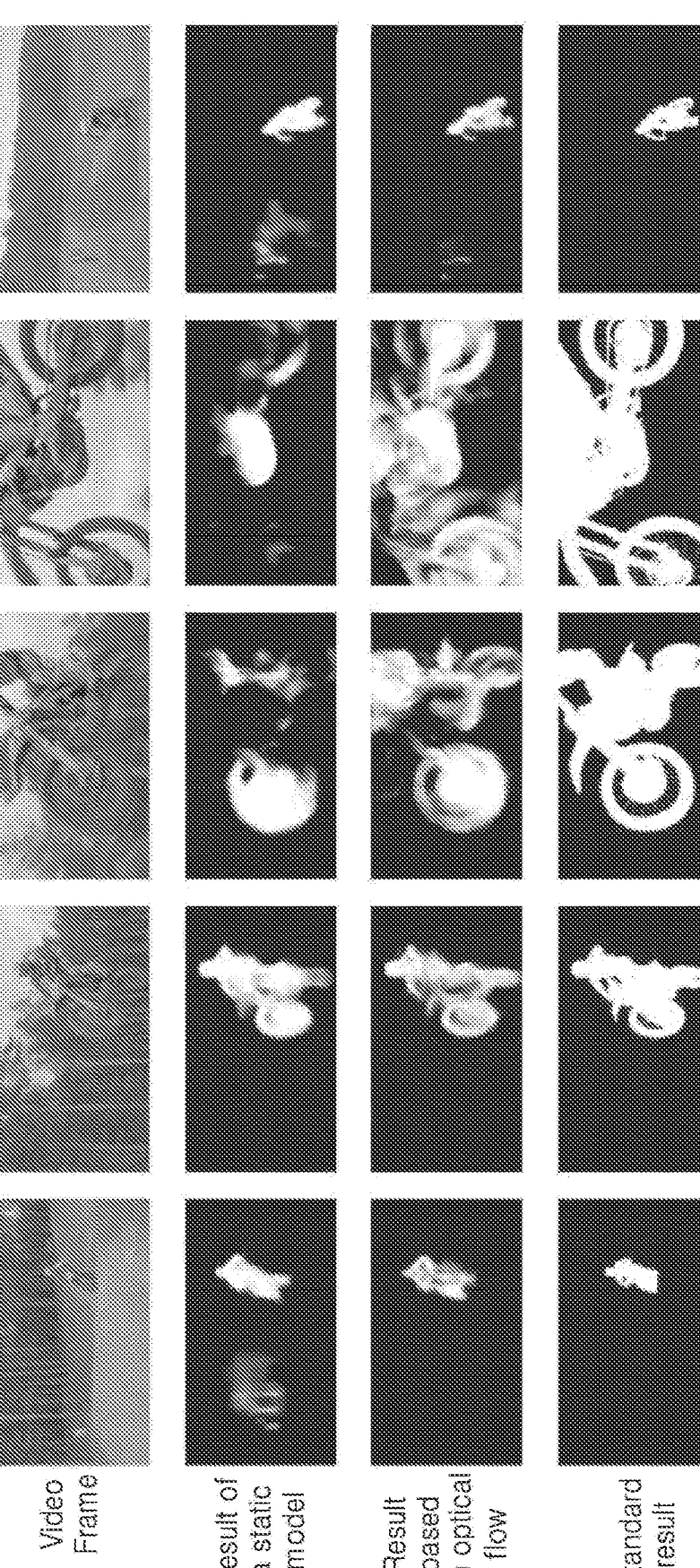

FIG. 7 is a schematic diagram of optical flow-based video salient object detection according to an embodiment of the disclosure. Referring to FIG. 7, a video salient object refers to an object in a video picture that is most appealing. Referring to FIG. 7, a moving object in a video is often an arresting object. Optical flow characterization is a pixel-level motion, which may be thus regarded as an important prompt about the video salient object. Since the optical flow estimation model adopted in the embodiments of the disclosure is very lightweight and has high optical flow estimation efficiency, the model has a good potential in real-time salient object detection.

Figure 8:
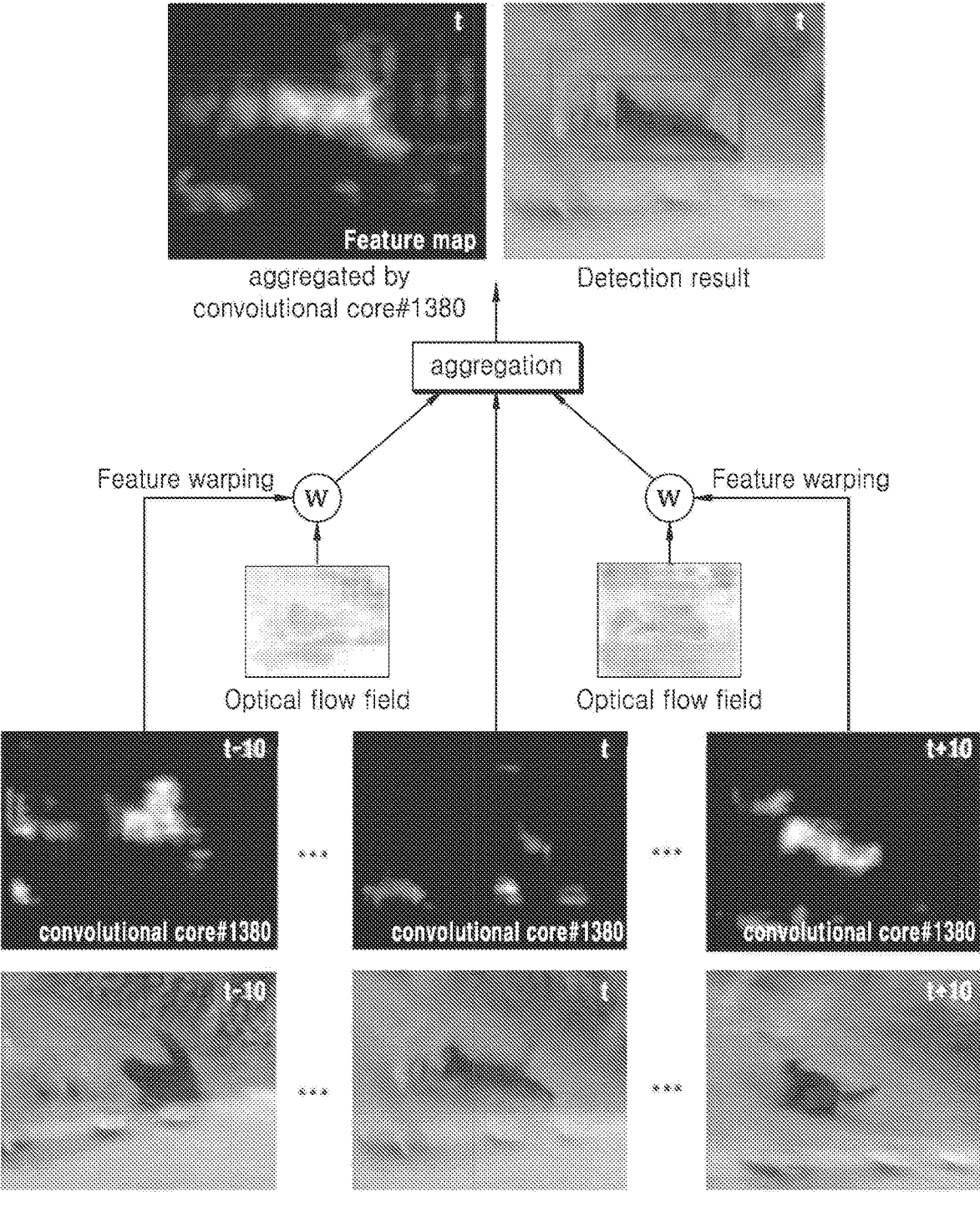

FIG. 8 is a schematic diagram of optical flow-based video object detection according to an embodiment of the disclosure. Referring to FIG. 8, objects of interest in a video tend to have some motion between adjacent frames. Optical flow information can help to characterize edges of moving objects to a large extent, and thus can aid in video object detection. The optical flow estimation method adopted in the embodiments of the disclosure achieves a good balance between speed and accuracy, and thus may have a good potential for application in real-time video object detection.

Figure 9:
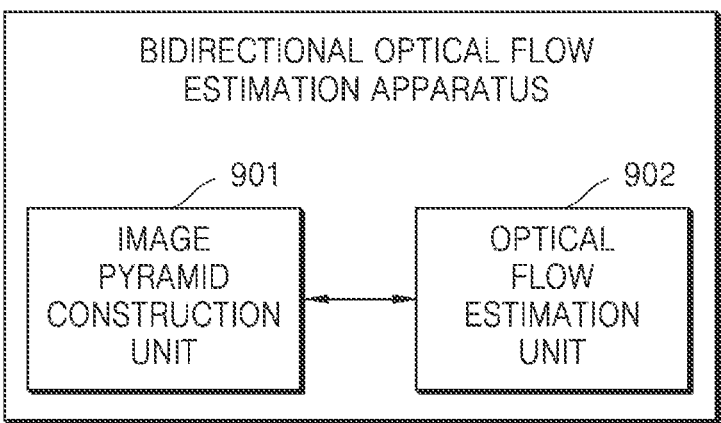
FIG. 9 is a structural schematic diagram of an apparatus according to an embodiment of the disclosure.

FIG. 9 is a structural schematic diagram of an apparatus according to an embodiment of the disclosure.

Corresponding to the above-mentioned method embodiment, an embodiment of the disclosure also proposes a bidirectional optical flow estimation apparatus. Referring to FIG. 9, the apparatus includes: an image pyramid construction unit 901, configured to acquire a target image pair of which optical flow is to be estimated, and construct an image pyramid for each target image in the target image pair; an optical flow estimation unit 902, configured to perform bidirectional optical flow estimation using a pre-trained optical flow estimation model based on the image pyramid, to obtain bidirectional optical flow between the target images, in which an optical flow estimation module in the optical flow estimation model is recursively called to perform the bidirectional optical flow estimation sequentially based on images of respective layers in the image pyramid according to a preset order, forward warping towards middle processing is performed on an image of a corresponding layer of the image pyramid before each call of the optical flow estimation module, and an image of an intermediate frame obtained by the forward warping towards middle processing is inputted into the optical flow estimation module.

It should be noted that the above-mentioned method and apparatus embodiments are based on the same inventive concept. Since the principles of the method and the apparatus for solving the problems are similar, the apparatus and method implementations may be referred to each other, and the repetition will be omitted herein.

Based on the above-mentioned bidirectional optical flow estimation method embodiment, an embodiment of the disclosure also implements a bidirectional optical flow estimation device, including a processor and a memory. The memory stores an application program executable by the processor for causing the processor to perform the bidirectional optical flow estimation method as described above. Specifically, a system or apparatus provided with a storage medium may be provided. Software program codes realizing the functions of any implementation in the above-mentioned embodiments are stored on the storage medium, and a computer (or central processing unit (CPU) or memory protection unit (MPU)) of the system or apparatus is caused to read out and execute the program codes stored in the storage medium. In addition, some or all of actual operations may be completed by an operating system or the like operating on the computer through instructions based on the program codes. It is also possible to write the program codes read out from the storage medium into a memory arranged in an expansion board inserted into the computer or into a memory arranged in an expansion unit connected to the computer. Then, a CPU or the like installed on the expansion board or the expansion unit is caused to perform some or all of the actual operations through the instructions based on the program codes, thereby realizing the functions of any of the above-mentioned bidirectional optical flow estimation method implementations.

The memory may be specifically implemented as various storage media such as an electrically erasable programmable read-only memory (EEPROM), a flash memory, and a programmable program read-only memory (PROM). The processor may be implemented to include one or more central processing units or one or more field programmable gate arrays that integrate one or more central processing unit cores. Specifically, the central processing unit or the central processing unit core may be implemented as a CPU or MPU.

An embodiment of the disclosure implements a computer program product, including computer programs/instructions which, when executed by a processor, implement the steps of the bidirectional optical flow estimation method as described above.

In an embodiment, a bidirectional optical flow estimation apparatus comprises: an image pyramid construction unit, configured to: acquire a target image pair of which optical flow is to be estimated, and construct an image pyramid for each target image in the target image pair, and an optical flow estimation unit, configured to: perform bidirectional optical flow estimation using a pre-trained optical flow estimation model based on the image pyramid for each target image to obtain bidirectional optical flow between the target images of the target image pair, wherein an optical flow estimation module in the optical flow estimation model is recursively called to perform the bidirectional optical flow estimation sequentially based on images of respective layers in the image pyramid for each target image according to a preset order, wherein forward warping towards middle processing is performed on an image of a corresponding layer of the image pyramid before each call of the optical flow estimation module, and wherein an image of an intermediate frame obtained by the forward warping towards middle processing is inputted into the optical flow estimation module.

In an embodiment, a computer program product comprises computer programs which, when executed by a processor, cause the processor to: acquire a target image pair of which optical flow is to be estimated, construct an image pyramid for each target image in the target image pair, and perform bidirectional optical flow estimation using a pre-trained optical flow estimation model based on the image pyramid for each target image to obtain bidirectional optical flow between the target images of the target image pair, wherein an optical flow estimation module in the optical flow estimation model is recursively called to perform the bidirectional optical flow estimation sequentially based on images of respective layers in the image pyramid for each target image according to a preset order, wherein forward warping towards middle processing is performed on an image of a corresponding layer of the image pyramid before each call of the optical flow estimation module, and wherein an image of an intermediate frame obtained by the forward warping towards middle processing is inputted into the optical flow estimation module.

It should be noted that not all of the steps and modules in the above flowcharts and structural diagrams are necessary and that some of the steps or modules may be omitted according to actual needs. The order of execution of the steps is not fixed and may be adjusted as required. The division of various modules is merely to facilitate the description of the functional division adopted. In actual implementation, a module may be divided by multiple modules, the functions of the multiple modules may also be realized by the same module, and these modules may be located in the same device or in different devices.

Hardware modules in the various implementations may be implemented mechanically or electronically. For example, a hardware module may include a specially designed permanent circuit or logic device (e.g. a dedicated processor such as FPGA or ASIC) for completing a particular operation. The hardware module may also include a programmable logic device or circuit (e.g. including a general purpose processor or other programmable processors) temporarily configured by software for performing a particular operation. The implementation of the hardware module using a mechanical mode, or using a dedicated permanent circuit, or using a temporarily configured circuit (e.g. configured by software) may be determined based on cost and time considerations.

As used herein, "schematic" means "serving as an example, instance, or illustration", and any illustration or implementation described herein as "schematic" is not to be construed as a preferred or advantageous technical solution. For simplicity of the drawings, only those portions of the drawings that are related to the disclosure are schematically depicted in the drawings and do not represent an actual structure as a product. In addition, in order to provide a concise understanding of the drawings, only one of components having the same structure or function is schematically illustrated in some drawings or may be marked. As used herein, "a/an" does not represent a limitation of the number of relevant portions of the disclosure to "only one", and "a/an" does not represent the exclusion of a situation where the number of relevant portions of the disclosure is "more than one". As used herein, "upper", "lower", "front", "back", "left", "right", "inner", "outer", and the like are used merely to represent relative positional relationships between the relevant portions and do not define absolute positions of these relevant portions.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A bidirectional optical flow estimation method, the method comprising:

acquiring a target image pair of which optical flow is to be estimated;

constructing an image pyramid for each target image in the target image pair; and performing bidirectional optical flow estimation using a pre-trained optical flow estimation model based on the image pyramid for each target image to obtain bidirectional optical flow between the target images of the target image pair, wherein an optical flow estimation module in the optical flow estimation model is recursively called to perform the bidirectional optical flow estimation sequentially based on images of respective layers in the image pyramid for each target image according to a preset order, wherein forward warping towards middle processing is performed on an image of a corresponding layer of the image pyramid before each call of the optical flow estimation module, and wherein an image of an intermediate frame obtained by the forward warping towards middle processing is inputted into the optical flow estimation module, wherein the performing of the bidirectional optical flow estimation by each call of the optical flow estimation module comprises:

performing feature extraction on the image of the intermediate frame inputted to the optical flow estimation module using a convolutional neural network (CNN) feature extractor, to obtain a CNN feature of the image of the intermediate frame;

determining a corresponding cost volume based on the CNN feature of the image of the intermediate frame;

performing channel stacking using the CNN feature of the image of the intermediate frame, the corresponding cost volume, bidirectional optical flow outputted from a previous optical flow estimation, and a CNN feature of the bidirectional optical flow outputted from the previous optical flow estimation;

inputting a channel stacking result into an optical flow estimation network to perform optical flow estimation;

performing up-sampling on bidirectional optical flow obtained by the optical flow estimation and a CNN feature of the bidirectional optical flow respectively; and outputting an up-sampling result.

2. The method according to claim 1, wherein the preset order is an ascending order of image scales.

3. The method according to claim 1, wherein the performing of the forward warping towards middle processing comprises one of:

if the optical flow estimation module is to be called for a first time currently, performing the forward warping towards middle processing based on uppermost images in the image pyramid for each target image and initial bidirectional optical flow, to obtain images of intermediate frames corresponding to the uppermost images respectively; or performing the forward warping towards middle processing based on corresponding images in the image pyramid of a current call of the optical flow estimation module and bidirectional optical flow outputted from a previous call of the optical flow estimation module, to obtain images of intermediate frames of the corresponding images respectively, and wherein the initial bidirectional optical flow is 0.

4. The method according to claim 1, wherein the performing of the channel stacking comprises one of:

if the optical flow estimation module is called for a first time currently, performing the channel stacking on the CNN feature of the image of the intermediate frame, the corresponding cost volume, an initial bidirectional optical flow, and a CNN feature of the initial bidirectional optical flow; or performing channel stacking on the CNN feature of the image of the intermediate frame, the corresponding cost volume, the bidirectional optical flow outputted from the previous optical flow estimation by the optical flow estimation module, and the CNN feature of the bidirectional optical flow outputted from the previous optical flow estimation, and wherein the initial bidirectional optical flow is 0 and the CNN feature of the initial bidirectional optical flow is 0.

5. The method according to claim 1, further comprising one of:

if the optical flow estimation module is called for a Nth time currently and N is a number of layers of the image pyramid of a target image of the target image pair, matching a resolution of the up-sampling result with a resolution of a lowermost image of the image pyramid; or matching a resolution of the up-sampling result with a resolution of an image inputted in a next optical flow estimation.

6. A bidirectional optical flow estimation device comprising:

a processor; and a memory, wherein the memory stores an application program executable by the processor to cause the processor to:

acquire a target image pair of which optical flow is to be estimated, construct an image pyramid for each target image in the target image pair, and perform bidirectional optical flow estimation using a pre-trained optical flow estimation model based on the image pyramid for each target image to obtain bidirectional optical flow between the target images of the target image pair, wherein an optical flow estimation module in the optical flow estimation model is recursively called to perform the bidirectional optical flow estimation sequentially based on images of respective layers in the image pyramid for each target image according to a preset order, wherein forward warping towards middle processing is performed on an image of a corresponding layer of the image pyramid before each call of the optical flow estimation module, and wherein an image of an intermediate frame obtained by the forward warping towards middle processing is inputted into the optical flow estimation module, wherein the memory stores an application program configured for the performing of bidirectional optical flow estimation that, when executed by the processor, causes the processor to:

perform feature extraction on the image of the intermediate frame inputted to the optical flow estimation module using a convolutional neural network (CNN) feature extractor, to obtain a CNN feature of the image of the intermediate frame;

determine a corresponding cost volume based on the CNN feature of the image of the intermediate frame;

perform channel stacking using the CNN feature of the image of the intermediate frame, the corresponding cost volume, bidirectional optical flow outputted from a previous optical flow estimation, and a CNN feature of the bidirectional optical flow outputted from the previous optical flow estimation;

input a channel stacking result into an optical flow estimation network to perform optical flow estimation;

perform up-sampling on bidirectional optical flow obtained by the optical flow estimation and a CNN feature of the bidirectional optical flow respectively; and output an up-sampling result.

7. A non-transitory computer-readable storage medium, storing computer-readable instructions for performing a bidirectional optical flow estimation method comprising:

acquiring a target image pair of which optical flow is to be estimated;

constructing an image pyramid for each target image in the target image pair; and performing bidirectional optical flow estimation using a pre-trained optical flow estimation model based on the image pyramid for each target image, to obtain bidirectional optical flow between the target images of the target image pair, wherein an optical flow estimation module in the optical flow estimation model is recursively called to perform the bidirectional optical flow estimation sequentially based on images of respective layers in the image pyramid for each target image according to a preset order, wherein forward warping towards middle processing is performed on an image of a corresponding layer of the image pyramid before each call of the optical flow estimation module, and wherein an image of an intermediate frame obtained by the forward warping towards middle processing is inputted into the optical flow estimation module, wherein the performing of the bidirectional optical flow estimation by each call of the optical flow estimation module comprises:

performing feature extraction on the image of the intermediate frame inputted to the optical flow estimation module using a convolutional neural network (CNN) feature extractor, to obtain a CNN feature of the image of the intermediate frame;

determining a corresponding cost volume based on the CNN feature of the image of the intermediate frame;

performing channel stacking using the CNN feature of the image of the intermediate frame, the corresponding cost volume, bidirectional optical flow outputted from a previous optical flow estimation, and a CNN feature of the bidirectional optical flow outputted from the previous optical flow estimation;

inputting a channel stacking result into an optical flow estimation network to perform optical flow estimation;

performing up-sampling on bidirectional optical flow obtained by the optical flow estimation and a CNN feature of the bidirectional optical flow respectively; and outputting an up-sampling result.

\* \* \* \* \*